Oct. 3, 1961   J. H. GROSS ET AL   3,002,831
FERTILIZER GRANULATION PROCESS
Filed June 16, 1958
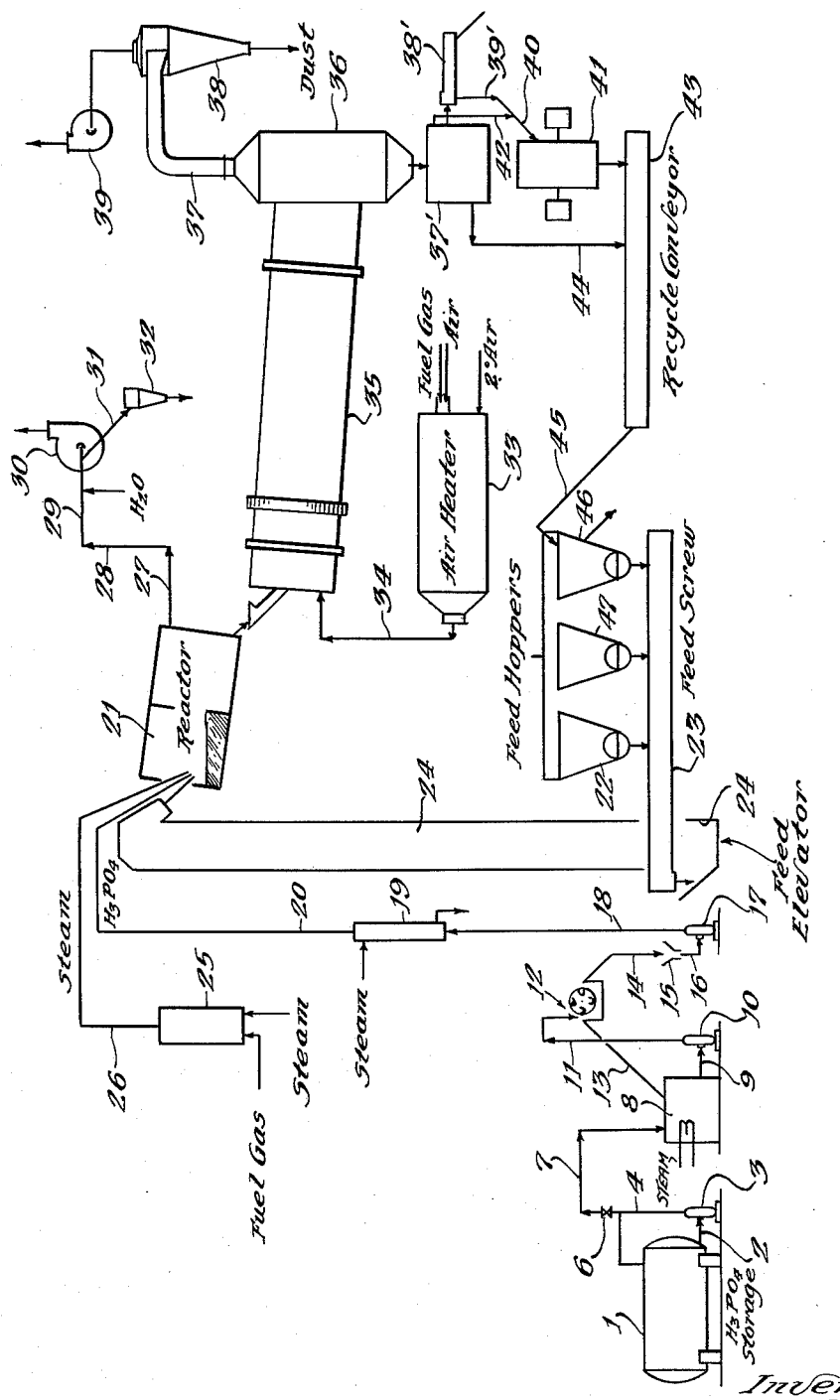
Inventors:
John H. Gross
Louis E. Bostwick
By: Ernest V. Haines
Attorney United States Patent Office 3,002,831
Patented Oct. 3, 1961

3,002,831
FERTILIZER GRANULATION PROCESS
John H. Gross and Louis E. Bostwick, Lakeland, Fla., assignors to International Minerals & Chemical Corporation, a corporation of New York
Filed June 16, 1958, Ser. No. 742,227
5 Claims. (Cl. 71—64)

This invention relates to the production of granular triple superphosphate fertilizer. More particularly, the invention relates to a process for the production of granular triple superphosphate fertilizer directly from phosphate rock and phosphoric acid.

Triple superphosphate is conventionally produced by the reaction of phosphate rock with phosphoric acid in proportions requisite to convert essentially all of the phosphate materials present to mono-calcium phosphate. In accordance with common practice, the triple superphosphate reaction mixture is "denned" or cured for a time period requisite to permit substantial completion of the acidulation reaction. Conventional denned or cured triple superphosphate is essentially non-granular, and is converted to a granular product by a granulation operation practiced subsequent to the acidulation and curing procedure.

Progressively increasing demands for granular fertilizer products have occasioned efforts to devise economically and procedurally more advantageous methods for the production of granular triple superphosphate. One such effort is reflected in the activities of the TVA in the development of a so-called "one-step" granular triple superphosphate process. Pursuant to the TVA procedure, phosphoric acid and phosphate rock are simultaneously mixed and rolled into pellets in an acidulating drum. The so-formed pellets are discharged from the drum and cured for about one week to substantially complete the acidulation reaction.

The TVA "one-step" process is beset by a myriad of procedural problems which detract from its economic feasibility and appear to preclude its commercial application on a continuous basis. Included among such problems is the formation, in the acidulating drum, of large lumps of acidulated rock, the accumulation of acidulated rock on the walls of the acidulating drum, wide variation in the quality and physical properties of the product and the plugging of the phosphoric acid inlets.

It is a primary object of this invention to provide an integrated process for the direct production of granular triple superphosphate from phosphate rock and phosphoric acid.

It is a further primary object of the invention to provide a process, which can continuously be practiced on a commercial scale, for the direct production of granular triple superphosphate from phosphate rock and phosphoric acid.

It is a specific object of the invention to provide a method for the production of granular triple superphosphate, directly from phosphate rock and phosphoric acid, in which the reaction conditions are controlled to preclude the formation of large lumps of acidulated rock, and the accumulation of acidulated rock on the walls of the reactor in which the acidulation is effected.

It is an additional specific object of the invention to provide a process for the direct production of granular triple superphosphate in which the reaction conditions are, at least in part, controlled by the introduction of superheated steam into the acidulation reaction zone.

It is a particular object of the invention to provide a process for the continuous commercial production of granular triple superphosphate directly from phosphate rock and phosphoric acid in which interdependent variables including feed rates of reactants, reaction bed conditions, rock particle size distribution and the relative proportions of reactants and conditioning materials, including superheated steam, are controlled to insure the continuous formation of a satisfactory product.

It is an important object of the invention to provide a process for the continuous production of granular triple superphosphate characterized by a commercially acceptable available phosphorus pentoxide content, ammoniation capacity and phosphorus pentoxide to calcium oxide mol ratio.

Now, in accordance with this invention, there is provided a process for the production of granular triple superphosphate which comprises, as a first step, reacting in a moving bed including the recycled product of said process, (a) minus 100 mesh comminuted phosphate rock at least about fifty weight percent of which is minus 200 mesh and which contains at least about sixty weight percent bone phosphate of lime, and (b) phosphoric acid containing at least about forty-five weight percent of phosphorus pentoxide, the relative proportions of said rock and said acid being such that the ratio of parts by weight of phosphorus pentoxide supplied by said acid to parts by weight of phosphorus pentoxide supplied by said rock is from about 2.2 to about 2.8, maintaining the temperature in said bed within the range of from about 230° F. to about 250 F., said reaction temperature being maintained at least in part by introducing into the acidulation reaction zone from about 150 to about 250 pounds of superheated steam per ton of product produced by said process, said steam being introduced at a temperature of from about 290° F. to about 400° F. and having at least about 75° F. of superheat, continuously discharging product from said first step; and, as a second step, drying said first step product under conditions requisite to provide a dried, granular triple superphosphate product at a temperature not in excess of about 140° F. to 175° F., and recycling to said first step, in an amount requisite to provide a recycle ratio of from about 1.1 to about 2.0 based on the relative proportions of said recycled material and total new product formed, a material selected from the group consisting of said dried second step product and mixtures of said second step product and ungranulated triple superphosphate, said mixtures containing at least about fifty weight percent of said second step product.

The invention accordingly resides in a series of integrated and interdependent procedural steps and conditions which, in combination, insure the practical continuous commercial production of granular triple superphosphate directly from phosphate rock and phosphoric acid.

The invention is applicable to produce granular triple superphosphate from all types of phosphate rock, without regard to source, which are characterized by a bone phosphate of lime (BPL) content of at least about sixty weight percent. Florida pebble phosphate, Tennessee phosphate rock, Montana phosphate rock, foreign phosphate rock such as Morocco phosphate, anl the like, of appropriate BPL content, are contemplated for use in the invention. The phosphate rock should be comminuted at least to minus about 100 mesh, and to provide at least about fifty weight percent, and preferably about eighty-five weight percent of minus 200 mesh material. Utilization of coarser or lower grade phosphate rock adversely affects the process by reducing the degree of initial rock conversion and increasing the free acid content of the fresh product.

Phosphoric acid, from any source, which contains at least about forty-five weight percent, and preferably from about fifty to about sixty weight percent of phosphorus pentoxide, is appropriate for utilization in the invention.

Wet process acid, furnace acid, and mixtures thereof accordingly, are contemplated. It will be appreciated that wet process phosphoric acid may contain impurities including iron and aluminum phosphate not present in significant amount in furnace acid. Wet process acid is preferred by reason of such impurities which act as binders for the granular superphosphate product. The impurities present may, however, render wet process acid quite viscous at ambient atmospheric temperatures in the contemplated concentrations. It is appropriate to warm or preheat such wet process acid to effect an appropriate reduction in the viscosity thereof proir to utilization in the rock acidulation step of the invention. Preheating also is advantageous in increasing the reactivity of the acid with the phosphate rock. The optimum extent of preheating is a function of the reduction of viscosity of the wet process acid with temperature and may readily be observed by a skilled operator. If the invention is practiced in the vicinity of a conventional wet process phosphoric acid plant in which relatively dilute, crude acid is concentrated by the evaporation of water, acid of appropriate concentration and temperature may be obtained directly from the evaporator and used as such. The acid is appropriately introduced through nozzles spaced along a pipe positioned above the moving reaction bed. Alternatively, the acid may be introduced below the reaction bed.

It is essential to the success of the integrated process of the invention that the phosphate rock and phosphoric acid reactants be commingled in proportions such that the ratio of parts by weight of phosphorus pentoxide supplied by phosphoric acid to parts by weight of phosphorus pentoxide supplied by phosphate rock fall within the range of from about 2.2 to about 2.8, material variations from which adversely affect the process and may ultimately require discontinuance by reason of the formation of a product which is chemically or physically unacceptable.

The physical operability of the process requires careful maintenance of proper conditions in the moving bed in which the acidulation reaction is effected. The reaction bed must be maintained sufficiently wet to form proper granules at all times. However, the bed ceases to move properly if only slightly too wet for a brief interval, with the resultant formation of large lumps of acidulated rock which, in extreme cases may jam the reactor and force termination of the process. Moreover, excessive reaction bed temperatures result in apparent partial dehydration of unreacted phosphoric acid which occasions aggregation of small particles in the reaction bed into large lumps. Accordingly, a salient feature of the invention entails control of the reaction bed conditions to achieve continuous or large scale production of a physically and chemically satisfactory product.

It has proven essential to the success of the invention to maintain a reaction bed temperature of from about 220° F. to about 250° F. and preferably about 230° F. If the reactor bed temperature varies materially from about 220° F. to about 250° F. temperature range, large lumps of acidulated rock are formed; the walls of the acidulation reactor become caked, and the operation is otherwise adversely affected and ultimately must be discontinued.

In accordance with an important feature of the invention, appropriate temperature and moisture conditions are maintained in the reaction bed by the introduction of superheated steam into the acidulation reaction zone. To be effective for the purposes of the invention, it is required that steam, at a temperature of at least about 290° F. and preferably from about 320° F. to about 350° F., and having at least about 75 degrees and preferably 100 to 125 degrees Fahrenheit of superheat be utilized at a rate of about 150 to about 250 pounds per ton of granulated triple superphosphate product. Wet or non-superheated steam is excluded as inoperable to achieve the objects of the invention. Moreover, utilization of excessively superheated steam tends to increase the amount of oversize or undersize material discharged from the first step of the process. More specifically, moderate excessive superheat effects undue drying and produces undersize material, whereas a further use in steam temperature results in a plastic condition which yields oversize material. Excessive heat in the reaction bed, including that occasioned by the utilization of steam overly superheated can appropriately be dissipated by spraying water into the acidulation reaction zone. In the preferred practice of the invention, the superheated steam is introduced through spaced openings in a pipe positioned beneath the moving reaction bed. Alternatively, the steam may be introduced above the reaction bed.

Maintenance of proper reaction bed conditions for practical commercial production of granular triple superphosphate by the method of the invention further requires control of the weight ratio of recycled dry, triple superphosphate material to the reaction bed to total fresh product produced within the range of about 1.1 to 2.0.

In lieu of the utilization solely of granular triple superphosphate product, conventional nongranular, run of pile triple superphosphate can be employed in an amount constituting not in excess of about 50 and preferably from about 25 to about 50 weight percent of the recycle stream.

The reaction product of the first step of the process of the invention is dried and cooled in the second step. Production of a dried product material which is commercially acceptable and which physically is in a condition such that the reaction bed of the first step is not adversely affected by the recycle of the second step product requires that the product be discharged from the second step at a temperature not in excess of about 175° F. and preferably not in excess of about 150° F. to about 160° F. Second step discharge material temperatures in excess of 175° F. inter alia, favor reversion of the product to a form of calcium phosphate less available than monocalcium phosphate and hence yield a product of inferior quality.

In general the process of the invention is effective to yield a granular triple superphosphate product containing a minimum of forty-eight weight percent total phosphorus pentoxide, and ammoniation capacity of at least about two pounds of ammonia per unit APA, at a phosphorus pentoxide to calcium oxide mol ratio of about 0.9. The degree of conversion rock in the feed material to the process to APA is normally increased as the $P_2O_5/CaO$ mol ratio of the feed is increased.

The particular apparatus employed forms no part of the invention and may be of conventional design with obvious modifications, if desired for adoption to the process of the invention. Apparatus appropriate for the first or acidulation and granulation step of the process may take the form of a rotating drum reactor provided with means for the introduction of rock, acid and steam. Such a reactor is generally shown in U.S. Patent 2,741,545. For use as a reactor in the process of the present invention, the apparatus of U.S. Patent 2,741,545 is provided with an appropriate means for the introduction of superheated steam.

It will be appreciated that optimum bed movement in an inclined rotary drum type of acidulation reactor is a function, inter alia, of the speed of drum rotation. More specifically, the acidulation drum is rotated at a speed such that the acidulation mixture will not adhere to the walls of the drum, but rather will cascade as the drum rotates. The critical speed, in terms of revolutions per minute, requisite to cause a particle to adhere to the wall of a rotating drum is defined by the formula as $$\frac{76.5}{\sqrt{D}}$$

where "D" is the diameter of the reactor. In general, it has been determined that appropriate cascading movement of the reaction bed is achieved in a rotating drum type acidulation reactor at a speed of rotation of from about 30% to about 45% and preferably from about 35% to about 40% of critical.

Suitable driers for use in the second step of the process include rotary kilns sold under the trade name "Roto-Louvre" driers, and other conventional rotary drier apparatus.

The figure of the drawing comprises a largely self-explanatory schematic flow-sheet representative of the practice of the process of the invention with wet process phosphoric acid and is described in reference to the ensuing examples.

EXAMPLE I

Referring to the figure, wet process phosphoric acid containing about 54% by weight of phosphorous pentoxide is withdrawn from storage vessel 1, through line 2, pump 3, line 4 to which is connected return line 5, valve 6, and line 7 into steam heated batch weigh tank 8. Weigh tank 8 is connected through line 9, pump 10 and line 11 to a roto-dip feeder 12 where the acid withdrawal rate is regulated. Overflow from roto-dip feeder 12 is returned to the weigh tank 8 through line 13. Metered phosphoric acid from the roto-dip feeder 12 is passed through line 14, funnel means 15, line 16, pump 17 and line 18 into acid reheater 19 where the acid temperature is adjusted to 210° F. to 220° F. From acid reheater 19, the heated acid is passed through line 20 into rotary drum acidulation reactor 21, which is inclined one inch per foot.

Phosphate rock, analyzing seventy-seven percent bone phosphate of lime and comminuted to one hundred weight percent minus 100 mesh and eighty-five weight percent minus 200 mesh is passed from rock hopper 22 through feed screw 23 into elevator 24 by which it is elevated to reactor 21.

Steam at a temperature of 277° F. is superheated about 85° F., by steam superheater 25 and passed through line 26 into reactor 21.

Rock is introduced into reactor 21 at a rate of 978 pounds per ton of product, phosphoric acid at a rate of 1442 pounds per ton of product, and superheated steam at a rate of 167 pounds per ton of product. The proportions of acid and rock were such that the weight ratio of phosphorous pentoxide supplied by acid to phosphorus pentoxide supplied by rock was 2.27.

Fumes were vented from reactor 21 through lines 27, 28 and 29 and thence into rotoclone 30, the underflow from which is passed through line 31 and cyclone 32. Water is sprayed inside rotoclone 30 against the center of the impeller.

In reactor 21, which is rotated at a rate about 36% of critical, the acidulation reaction mixture is formed into granules which are discharged into Roto-Louvre drier 35. The temperature of the acidulation reaction bed is 222° F.

Air and combustion gases heated to a temperature of about 200° F. to 300° F. in air heater 33 are introduced through line 34 into Roto-Louvre drier 35 for concurrent passage therethrough with granulated reactor product. Product is discharged from the Roto-Louvre drier at a temperature of about 165° F.

The discharge end of the Roto-Louvre drier is fitted with a chamber 36 from which dust and fumes are passed through conduit 37 into cyclones 38, the gaseous products from which are vented through exhauster 39. Granular discharge from the Roto-Louvre drier 35 passes through chamber 36 into wedge-wire, power driven screens 37 where a $-6+14$ mesh cut is withdrawn as product. Size distribution of the drier product is $+6$ mesh, 44.7%; $-6+14$ mesh, 37.1% and $-14$ mesh, 18.2% by weight.

The plus six mesh material is passed through lines 42 and 40 into cage mill 41. Cage mill discharge is deposited on recycle conveyor 43.

Minus fourteen mesh fines are conveyed from screens 37 through line 44 to recycle conveyor 43 and mixed with the cage mill discharge. Recycle conveyor 43 discharges into line 45 through which the $-14$ mesh fines and cage mill discharge is introduced into recycle feed hopper 46 which in turn is arranged to discharge into feed screw 23. A recycle ratio of 1.46 is maintained. A conventional triple super-phosphate feed hopper 47 is shown in the figure for the introduction of such material into the recycle stream.

The $-6+14$ mesh product, after curing for twenty-four hours contains 48.9 weight percent total $P_2O_5$; 45.4 weight percent available $P_2O_5$; and 9.2 weight percent free acid (acetone) and is characterized by a $P_2O_5/CaO$ mol ratio of 0.94. Rock conversion is 72%.

It is characteristic of the products of the invention that the availability of the phophorus pentoxide will increase on storage for not more than about thirty days. Hence, fresh product showing an undesirably high concentration of citrate insoluble phosphorus pentoxide will reflect satisfactory phosphorous pentoxide availability after storage.

EXAMPLE II

The process as described in Example I was repeated in the same apparatus on a continuous basis over a three day period of nine eight-hour shifts under the specific conditions indicated in Table I.

The products obtained were characterized by the properties reflected in Table II.

*Table I*

| Shift No. | Acid | | | Rock | | | Total Lbs. $P_2O_5$ | Total Lbs. CaO | Bed Temp., ° F. | Average Steam Temp., ° F. |
|---|---|---|---|---|---|---|---|---|---|---|
| | Rate, lbs./hr. | Wt. percent $P_2O_5$ | Wt. percent CaO | Rate, lbs./hr. | Wt. percent $P_2O_5$ | Wt. percent CaO | | | | |
| 1 | 612 | 52.87 | 0.982 | 404 | 34.4 | 49.03 | 462.6 | 204.1 | 249 | 381 |
| 2 | 610 | 53.24 | 0.96 | 397 | 35.0 | 49.09 | 463.8 | 200.8 | 237 | 301 |
| 3 | 624 | 52.89 | 0.991 | 410 | 35.8 | 49.68 | 473.8 | 209.9 | 243 | 331 |
| 4 | 636 | 53.48 | 0.973 | 403 | 35.1 | 49.68 | 481.6 | 206.4 | 247 | 375 |
| 5 | 645 | 53.31 | 0.94 | 412 | 34.9 | 48.85 | 487.6 | 207.4 | 231 | 355 |
| 6 | 650 | 53.35 | 1.01 | 414 | 34.73 | 49.13 | 490.6 | 210 | 224 | 375 |
| 7 | 644 | 53.37 | 0.973 | 408 | 33.78 | 47.89 | 481.5 | 201.7 | 214 | 296 |
| 8 | 629 | 53.27 | 0.99 | 419 | 34.5 | 48.07 | 479.7 | 207.6 | 216 | 321 |
| 9 | 655 | 53.27 | 0.99 | 399 | 34.5 | 48.07 | 486.6 | 198.3 | 230 | 300 |
| Averages | 634 | 53.23 | 0.98 | 407 | 34.7 | 48.83 | 478.6 | 205.1 | 232 | 337 |
| Temperature of sat. steam at 20 p.s.i.g., ° F. | | | | | | | | | | 259 |
| Degrees of superheat, ° F. | | | | | | | | | | 78 |

Table II

| Shift No. | P₂O₅/CaO Mol Ratio | Wt. percent Available P₂O₅ | Wt. percent C.I. P₂O₅ | Wt. percent Total P₂O₅ | Wt. percent Moisture | Wt. percent Free Acid (Acetone) |
|---|---|---|---|---|---|---|
| 1 | 0.970 | 46.27 | 2.33 | 48.6 | 6.12 | 9.02 |
| 2 | 0.952 | 45.65 | 2.75 | 48.4 | 5.27 | 7.20 |
| 3 | 0.933 | 45.72 | 2.85 | 48.57 | 4.97 | 7.30 |
| 4 | 0.920 | 45.10 | 2.9 | 48.0 | 5.16 | 7.50 |
| 5 | 0.961 | 44.90 | 3.8 | 48.7 | 5.82 | 8.48 |
| 6 | 0.934 | 45.89 | 2.75 | 48.64 | 6.47 | 8.33 |
| 7 | 0.942 | 45.05 | 2.95 | 48.0 | 6.07 | 8.53 |
| 8 | 0.954 | 44.55 | 3.25 | 47.8 | 5.71 | 8.43 |
| 9 | 0.945 | 44.6 | 3.6 | 48.2 | 5.71 | 6.76 |
| Average | 0.946 | 45.3 | 3.02 | 48.3 | 5.70 | 7.95 |

It is apparent that the invention embraces a highly efficient process which can be practiced continuously and on a commercial scale for the production of granular triple superphosphate from phosphate rock and phosphoric acid and hence represents a significant contribution to the art.

We claim:

1. A process for the production of granular triple superphosphate which comprises, as a first step, reacting in a moving bed including the recycled product of said process, (a) minus 100 mesh comminuted phosphate rock at least about fifty weight percent of which is minus 200 mesh and which contains at least about sixty weight percent bone phosphate of lime, and (b) phosphoric acid containing at least about forty-five weight percent of phosphorus pentoxide, the relative proportions of said rock and said acid being such that the ratio of parts by weight of phosphorus pentoxide supplied by said acid to parts by weight of phosphorus pentoxide supplied by said rock is from about 2.2 to about 2.8, maintaining the temperature in said bed within the range of from about 220° F. to about 250° F., said reaction temperature being maintained at least in part by introducing into the acidulation reaction zone from about 150 to about 250 pounds of superheated steam per ton of product produced by said process, said superheated steam being introduced at a temperature of from about 290° F. to about 400° F. and having at least about 75° F. of superheat, continuously discharging product from said first step; and, as a second step, drying said first step product under conditions requisite to provide a dried, granular triple superphosphate product at a temperature not in excess of about 175° F., and recycling to said first step, in an amount requisite to provide a recycle ratio of from about 1.1 to about 2.0 based on the relative proportions of said recycled material and new product produced, a material selected from the group consisting of said dried second step product and mixtures of said second step product and ungranulated triple superphosphate, said mixtures containing at least about fifty weight percent of said second step product.

2. The process of claim 1 wherein said recycled product is said dried second step product.

3. The process of claim 1 wherein said superheated steam is characterized by from about 100° F. to about 125° F. of superheat.

4. The process of claim 1 wherein said reactor bed temperature is maintained in the range of from about 230° F. to about 250° F.

5. A continuous process for the production of granular triple superphosphate which comprises, as a first step, continuously reacting in a moving bed including the recycled product of said process, (a) minus 100 mesh comminuted phosphate rock at least about fifty weight percent of which is minus 200 mesh and which contains at least about sixty weight percent bone phosphate of lime, and (b) phosphoric acid containing at least about forty-five weight percent of phosphorus pentoxide, the relative proportions of said rock and said acid being such that the ratio of parts by weight of phosphorus pentoxide supplied by said acid to parts by weight of phosphorus pentoxide supplied by said rock is from about 2.2 to about 2.8, maintaining the temperature in said bed within the range of from about 220° F. to about 250° F., said reaction temperature being maintained at least in part by introducing into the acidulation reaction zone from about 150 to about 250 pounds of superheated steam per ton of product produced by said process, said superheated steam being introduced at a temperature of from about 290° F. to about 400° F. and having at least about 75° F. of superheat, continuously discharging product from said first step; and, as a second step, continuously drying said first step product under conditions requisite to provide a dried, granular triple superphosphate product at a temperature not in excess of about 175° F., and continuously recycling to said first step, in an amount requisite to provide a recycle ratio of from about 1.1 to about 2.0 based on the relative proportions of said recycled material and new product formed, a material selected from the group consisting of said dried second step product and mixtures of said dried second step product and mixtures of said second step product and ungranulated triple superphosphate, said mixtures containing at least about fifty weight percent of said second step product.

References Cited in the file of this patent

UNITED STATES PATENTS

| | | |
|---|---|---|
| 2,448,126 | Shoeld | Aug. 31, 1948 |
| 2,635,955 | Constant | Apr. 21, 1953 |
| 2,680,680 | Coleman | June 8, 1954 |